(12) United States Patent
Kropp (10) Patent No.: US 6,885,826 B2
(45) Date of Patent: Apr. 26, 2005

(54) OPTICAL TRANSMITTER AND METHOD FOR GENERATING A DIGITAL OPTICAL SIGNAL SEQUENCE

(75) Inventor: Jörg-Reinhardt Kropp, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/057,105

(22) Filed: Jan. 25, 2002

(65) Prior Publication Data

US 2002/0181063 A1 Dec. 5, 2002

(30) Foreign Application Priority Data

May 31, 2001 (DE) .......................................... 101 27 541

(51) Int. Cl.[7] .............................................. H04B 14/00
(52) U.S. Cl. ........................ 398/182; 398/183; 398/186
(58) Field of Search ................................ 359/180, 188, 359/333, 237, 324; 398/182; 330/308, 59; 370/215; 341/13, 14

(56) References Cited

U.S. PATENT DOCUMENTS

| | | | | |
|---|---|---|---|---|
| 3,727,061 A | * | 4/1973 | Dworkin ...................... | 398/98 |
| 4,467,468 A | | 8/1984 | Miller ......................... | 359/123 |
| 5,353,145 A | | 10/1994 | Le Coquil et al. .......... | 359/139 |
| 5,703,708 A | * | 12/1997 | Das et al. .................... | 359/140 |
| 6,096,496 A | * | 8/2000 | Frankel ......................... | 435/4 |

FOREIGN PATENT DOCUMENTS

GB    2269953 A  *  2/1994

OTHER PUBLICATIONS

NRZ vs. RZ in 10–40 Gbit/s dispersion–managed WDM transmission systems , M.I. Hayee, A.E. Willner, Department of Electric Engineering–Systems, USC, Los Angeles, CA; Optical Fiber Communication Conference and Exhibit, 1998. OFC '98., Technica Digest, 22–2.*

* cited by examiner

*Primary Examiner*—Hanh Phan
*Assistant Examiner*—David C. Payne
(74) *Attorney, Agent, or Firm*—Laurence A. Greenberg; Werner H. Stemer; Gregory L. Mayback (57) ABSTRACT

An optical transmitter and a method for generating a digital optical signal sequence are provided. The optical transmitter has light transmitters which are independently drivable and generate an optical signal for each of the bits of a digital electrical signal sequence that is to be converted into a digital optical signal sequence. The optical signals are combined and superposed into an optical signal path. A control device is provided for distributing the bits between the light transmitters.

25 Claims, 5 Drawing Sheets

OPTICAL TRANSMITTER AND METHOD FOR GENERATING A DIGITAL OPTICAL SIGNAL SEQUENCE

BACKGROUND OF THE INVENTION

Field of the Invention

The present invention relates to an optical transmitter for generating a digital optical signal sequence and a corresponding method for generating a digital optical signal sequence. A preferred area of application for the invention is optical data communication for extremely high transmission rates above 10 Gbit/s.

In the technical field of optical data communication, it is known to use optical transmitters with semiconductor lasers which convert an electrical signal sequence into an optical signal sequence. In particular, it is known to use edge emitting lasers (EEL) and surface emitting lasers (VCSEL= vertical cavity surface emitting laser) for this purpose. The lasers are either operated by direct modulation with an electrical drive current or a combination of semiconductor lasers and modulators is used. In the latter case a continuous laser light is modulated by an optically downstream modulator. However, modulators generally require a very complicated mounting and module technology and also electrical driving with high voltages, with the result that direct modulation is preferable in many applications.

During the direct modulation of a semiconductor laser, the following two effects, in particular, lead to undesirable limitation of the bandwidth, i.e. the maximum data rate that can be transmitted. Firstly, due to internal reaction times, the oscillation build-up behavior of a semiconductor laser is dependent on the "history", that is to say the respectively preceding signal composition. By way of example, the speed and shape of the rising edge of the last bit of the logic signal sequence "1 0 0 0 1" are different than in the logic signal sequence "1 0 1". In particular, the oscillation build-up behavior for a "1" bit is slowed down if the "1" bit considered is preceded by a plurality of "0" bits. The aforementioned effect leads to undesirable jitter, i.e. temporal fluctuation of the rising edges which has a restrictive effect on the bandwidth (so-called "data dependent jitter").

Secondly, during the falling edge of a "1" bit in the event of transition to the "0" level, undesirable post-oscillation is present which disturbs a subsequent logic signal and, in particular, influences the rising edge of a later "1" bit, which again leads to undesirable jitter.

SUMMARY OF THE INVENTION

It is accordingly an object of the invention to provide an optical transmitter and a method for generating a digital optical signal sequence which enable an improved data transmission bandwidth in the case of directly modulated semiconductor lasers which overcomes the hereinaforementioned disadvantages of the heretofore-known devices and methods of this general type.

With the foregoing and other objects in view there is provided, in accordance with the invention, an optical transmitter for generating a digital optical signal sequence, having a plurality of independently drivable light transmitters generating respective optical signals for respective bits of a digital electrical signal sequence. The respective optical signals are combined and superposed into an optical signal path. A control device is used to distribute the bits between the light transmitters.

In one embodiment the light transmitters generate the respective optical signals in a temporally staggered manner.

In another embodiment the bits of the digital electrical signal sequence are alternately applied to the light transmitters by the control device in a fixed temporal order.

In another embodiment the control device distributes between the light transmitters a number of bits of the digital electrical signal sequence which corresponds to a number of the light transmitters, and the light transmitters simultaneously generate the respective optical signals.

In another embodiment the respective optical signals are combined and superposed in the optical signal path in a temporally staggered manner. The optical signal path has a respective different length for each of the respective optical signals, the respective different length corresponding in each case to a length of one bit effecting a temporally staggered superposition of the respective optical signals.

In another embodiment the respective optical signals are combined and superposed in the optical signal path in a non-temporally staggered manner.

In another embodiment each of the light transmitters generates a pulse for a bit of the digital signal sequence, the bit being assigned by the control device.

In another embodiment the light transmitters are disposed at a short distance from one another on a semiconductor chip.

In another embodiment a single waveguide is disposed directly downstream of the light transmitters for receiving the respective optical signals emitted by the light transmitters. The light transmitters may be assigned to respective optical waveguides receiving the respective emitted optical signals, each of the respective optical waveguides being combined to form the single waveguide.

In another embodiment the respective optical signals from the light transmitters are coupled into the optical waveguide via a coupling optical configuration.

In another embodiment an even number of the light transmitters are provided.

In another embodiment four light of the transmitters are provided.

In another embodiment the light transmitters are EEL or VCSEL laser diodes disposed as an array.

With the foregoing and other objects in view there is provided, in accordance with the invention, a method for generating a digital optical signal sequence, in which a digital electrical signal sequence is converted into a digital optical signal sequence, using the steps of distributing bits of an electrical signal sequence between light transmitters generating a respective optical signal for each bit of the bits. Then combining and superposing each of the respective optical signals generated by the light transmitters in an optical signal path.

In one embodiment the step of generating the respective optical signal for each bit of the bits is performed in a temporally staggered manner.

In another embodiment the step of generating the respective optical signal for each bit of the bits is performed in such a way that the respective light transmitters generate the respective optical signal alternately and in a fixed order.

In another embodiment the step of generating the respective optical signal for each bit of the bits is performed in such a way that the light transmitters simultaneously generate the respective optical signal after a respective bit of the electrical signal sequence has been obtained.

In another embodiment the step of combining and superposing the respective optical signals generated by the light transmitters into an optical signal path is performed in a temporally staggered manner by use of respective signal paths of different lengths.

In another embodiment there is the step of coupling the respective optical signal of each of the light transmitters into an optical waveguide having a different length before combining and superposing the generated optical signals.

In another embodiment the step of combining and superposing the respective optical signal generated by the light transmitters into an optical signal path is performed in a non-temporally staggered manner.

In another embodiment the respective optical signal emitted by one of the light transmitters is a light pulse.

The present invention is distinguished by the fact that the optical transmitter has a plurality of independently drivable light transmitters and a control device which performs a distribution between the light transmitters of the bits of a digital electrical signal sequence that is to be converted into a digital optical signal sequence. In this case, the light transmitters generate an optical signal for each of the bits obtained and the optical signals generated by the light transmitters are combined and superposed into an optical signal path. The superposed optical signal then constitutes the signal for the data transmission.

The present invention is based on the concept of always beginning a logic "1" ("1" bit) after the longest possible number of logic "0" signals ("0" bits) in order to ensure that the rising edge is precisely defined and, moreover, is not disturbed by post-oscillation signals of preceding "1" bits. Consequently, according to the invention, the driving of a light transmitter for generating a "1" bit is intended always to begin from the logic value "0", and a plurality of "0" bits should be present before a "1" bit is generated again. For this purpose, the invention envisages the use of a plurality of light transmitters between which are distributed the light signals or bits of an electrical input signal that are to be generated. If "N" is equal to the number of light transmitters then each light transmitter needs to transmit only upon every N-th bit and has sufficient time in the interim to return completely to the value "0". Each light transmitter is driven independently in this case.

The invention reduces, in particular, jitter of the individual logic signals of a digital signal sequence and, therefore, enables the data transmission bandwidth to be increased.

In a preferred refinement of the invention, the light transmitters generate an optical signal for the bits obtained in each case in a temporally staggered manner. In this case, bits of the electrical signal sequence are alternately applied to the individual light transmitters by the control device in a preferably fixed order. The temporally staggered signals are then superposed to form the overall signal.

As an alternative, it may also be provided that in each case the control drive distributes between the light transmitters a number of bits of the digital electrical signal sequence which corresponds to the number of light transmitters, and the light transmitters simultaneously, that is to say not successively, generate an optical signal for the bits obtained.

In order to reestablish the original temporal order, provision is made in this case for the optical signals generated to be combined in the optical signal path in a temporally staggered manner. This is realized by the use of signal paths of the individual signals of different lengths before their union. The length difference between the signal paths in each case corresponds to the length of one bit or a multiple of this value. In order to produce signal paths of different lengths, the optical signals of the individual light transmitters are, for example, each coupled into an optical waveguide having a different length.

In an alternative refinement, the original temporal order is not reestablished and the simultaneously emitted optical signals are combined and superposed in the optical signal path in a non-temporally staggered manner. The resultant coding is known as "multilevel coding".

Preferably, in each case the individual light transmitters generate a light pulse for a bit of the digital signal sequence. The bit is assigned by the control device and the light pulse is combined with the light pulses of the further light transmitters.

In a preferred refinement of the invention, the plurality of light transmitters are disposed at a short distance from one another on a semiconductor chip. In one embodiment variant, the light transmitters are disposed directly upstream of an optical waveguide into which the light emitted by the light transmitters is coupled, for the purpose of coupling the optical signals generated into the optical signal path. This variant is advantageous in particular in the case of VCSEL lasers. The light from a plurality of VCSEL lasers is coupled into an optical waveguide directly or else via a coupling optical configuration.

In a second embodiment variant, each light transmitter is assigned an optical waveguide into which the light from the assigned light transmitter is coupled, and the individual waveguides are combined to form a single waveguide. This variant is suitable in particular for edge emitting lasers (EEL), in which it is difficult to couple light from a plurality of lasers into only one optical-fiber end face.

Preferably, an even number of light transmitters, in particular four light transmitters, are provided. The more light transmitters that are provided, the smaller a residual jitter and the higher the data rates that can be achieved.

The method according to the invention is distinguished by the fact that the bits of the electrical signal sequence are distributed between a plurality of light transmitters which generate an optical signal for each of the bits obtained, and the optical signals generated by the plurality of light transmitters are combined and superposed into an optical signal path.

Other features which are considered as characteristic for the invention are set forth in the appended claims.

Although the invention is illustrated and described herein as embodied in an optical transmitter and a method for generating a digital optical signal sequence, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
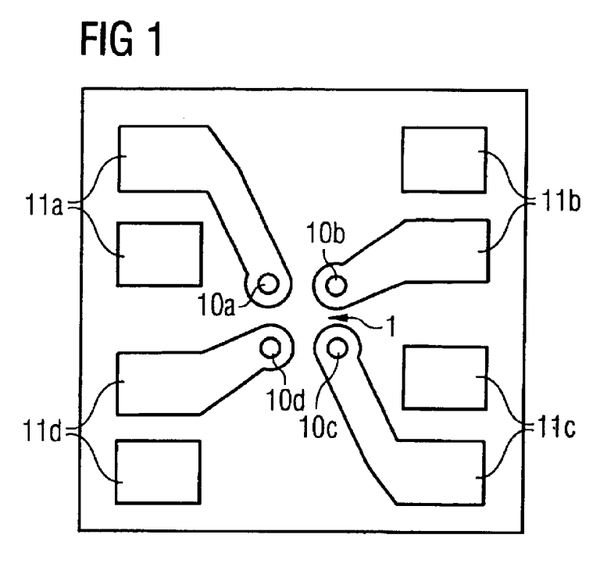
FIG. 1 is a diagrammatic plan view of an optical transmitter.

Referring now to the figures of the drawings in detail and first, particularly to FIG. 1, thereof, there is seen an array 1 of 2×2 surface emitting VCSEL lasers 10a, 10b, 10c, 10d disposed on a semiconductor chip 2. The distance between the VCSEL lasers 10a, 10b, 10c, 10d is very small and, by way of example, is a few $\mu$m to a few 10's of $\mu$m. Each of the laser diodes can be driven individually via connections 11a, 11b, 11c, 11d in a manner known to a person skilled in the art. For this purpose, driver circuits which are used and known to a person skilled in the art feed to the laser diodes a bias current and a modulation current, which is modulated in a manner dependent on the data signal to be transmitted.

It is likewise possible for the laser diodes to be electrically driven in each case with a delta pulse, i.e. a HIGH level of the data signal to be transmitted leads to an extremely short pulse or flash of light at the corresponding laser diode.

Furthermore, it is pointed out that the lasers used may be modified lasers in which e.g. a nonlinear saturable absorber is integrated in the laser resonator (so-called Q-switch). The saturable absorber enables very short and intensive pulses.

Figure 2:
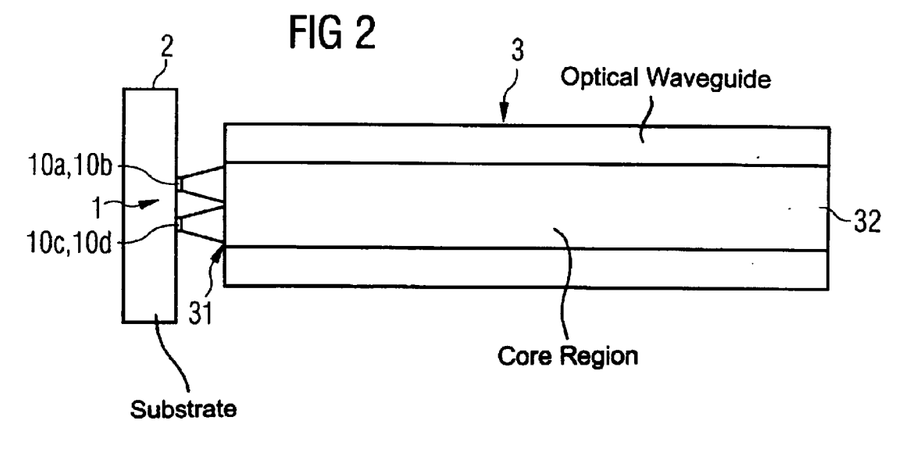
FIG. 2 is a side-elevational view of an optical transmitter.

As illustrated in the side view of FIG. 2, the laser array 1 is disposed on the semiconductor 2 directly opposite the end face 31 of an optical waveguide 3, in particular an optical fiber. In this case, the diameter of the optical waveguide 3 and, in particular, the diameter of the core region 32 of the optical waveguide 3 is dimensioned in such a way that the light emitted by all the VCSEL lasers 10a, 10b, 10c, 10d can be coupled into the waveguide 3 directly, i.e. without an additional optical configuration. This is the case, for example, with customary multimode waveguides having core diameters of 50 $\mu$m or 62.5 $\mu$m.

Figure 5:
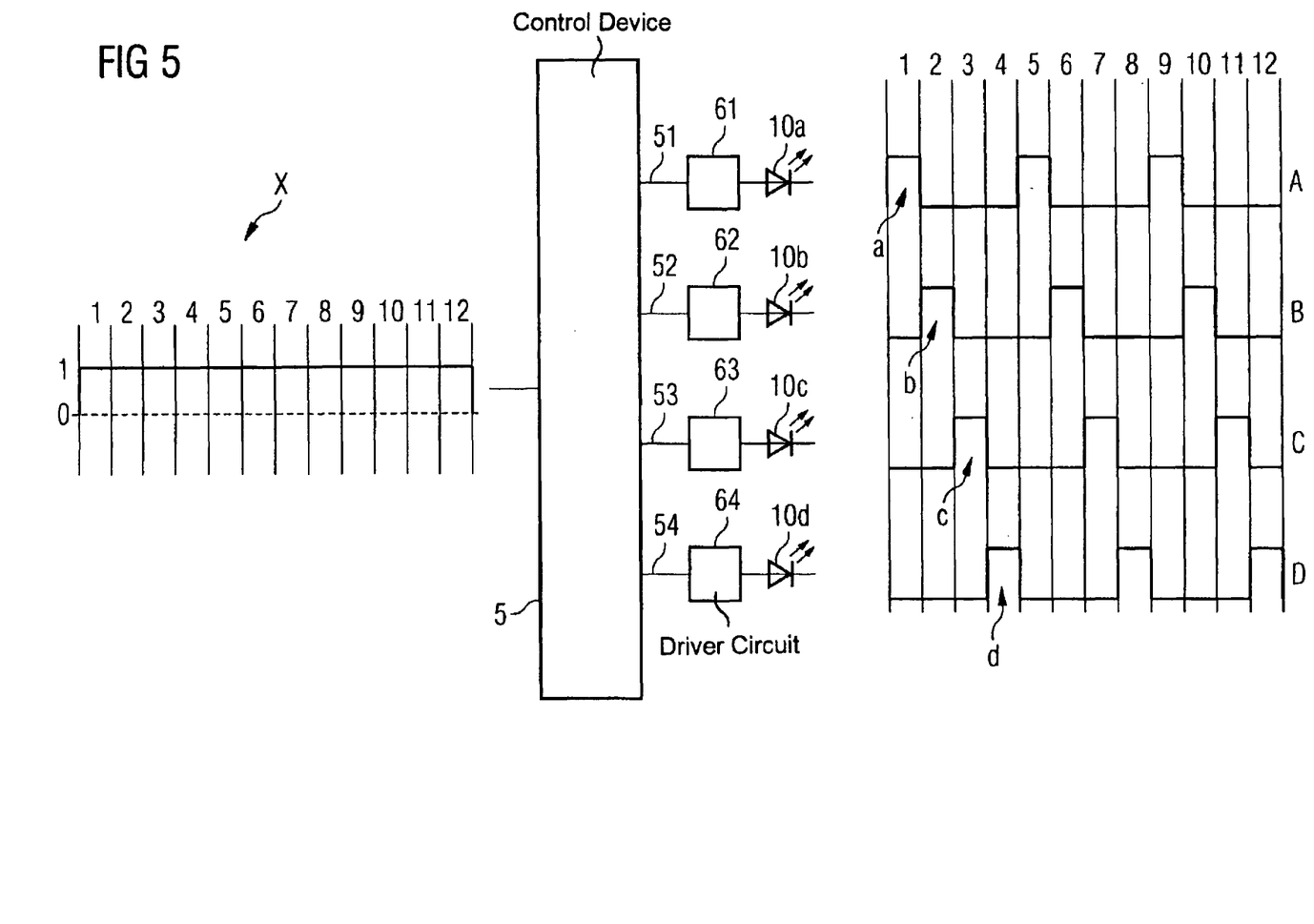
FIG. 5 is a schematic diagram illustrating the electrical driving of the optical transmitter and generated light signals for a signal sequence.
Figure 6:
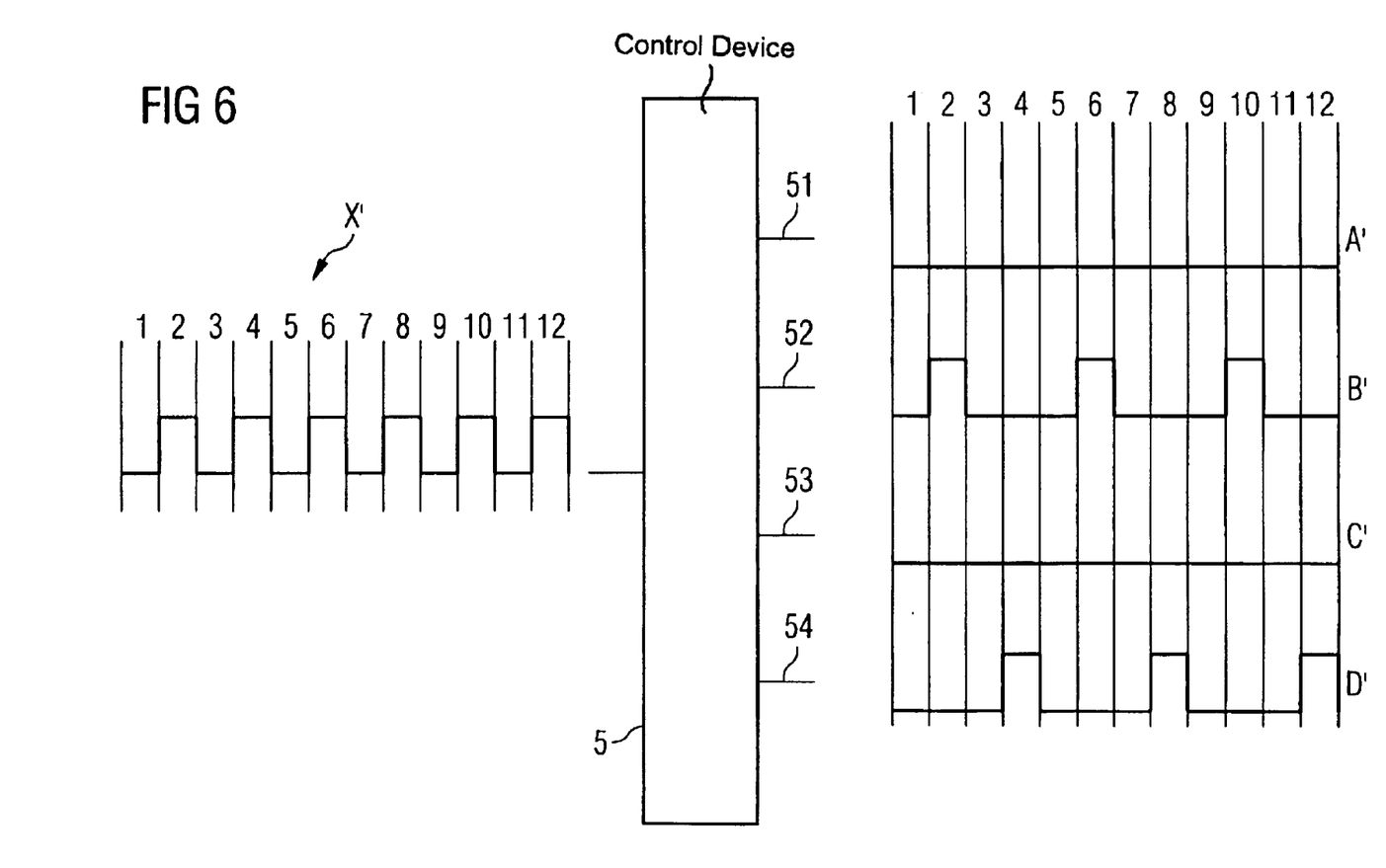
FIG. 6 is a schematic diagram illustrating the electrical driving of the optical transmitter of FIGS. 1 to 3 and generated light signals for a second example of a signal sequence.

The light signals which are emitted by the individual VCSEL lasers 10a, 10b, 10c, 10d and will be explained in more detail with reference to FIGS. 5 and 6 are automatically superposed due to being radiated into the optical waveguide 3 and are combined in the latter.

Figure 7:
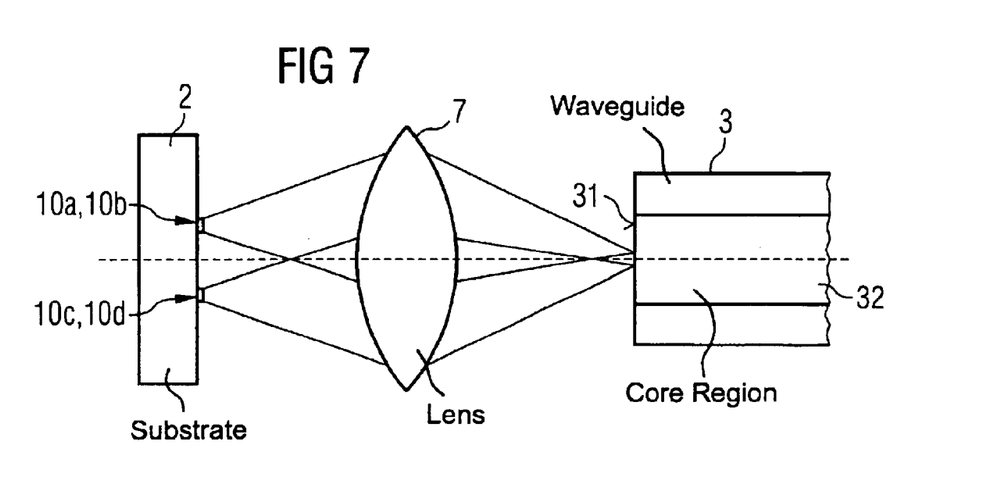
FIG. 7 is a block diagram illustrating a first example of a coupling optical configuration between an array of light transmitters and an optical waveguide.

As an alternative, a coupling optical configuration is inserted between the laser array 1 and the optical waveguide and provides optimum coupling of radiation from the VCSEL lasers 10a, 10b, 10c, 10d into the optical waveguide 3 through the choice of magnification or reduction. A first example of such a coupling optical configuration is illustrated in FIG. 7, in which a lens 7 images the light from the VCSEL lasers 10a, 10b, 10c, 10d onto the end face 31 of an optical waveguide 3, so that a reduced imaging is effected.

Figure 8:
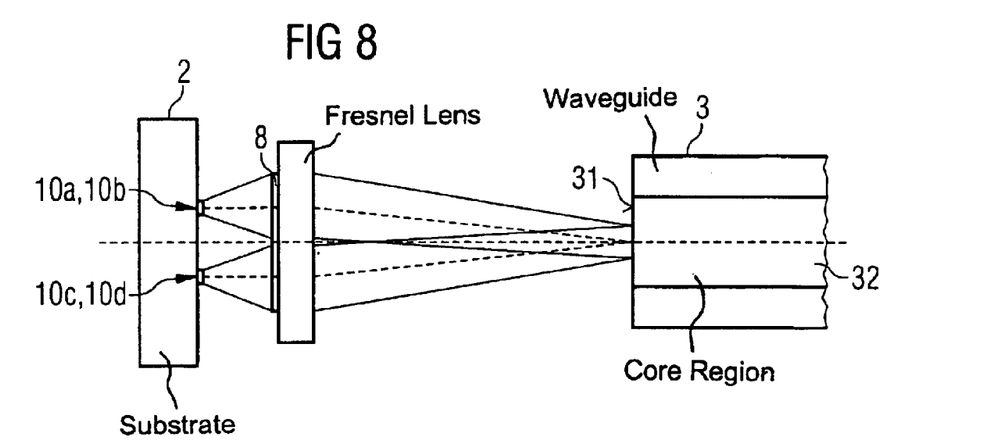
FIG. 8 is a block diagram illustrating a second example of a coupling optical configuration between an array of light transmitters and an optical waveguide.

FIG. 8 shows a second example of a coupling optical configuration between an array 1 of VCSEL lasers 10a, 10b, 10c, 10d and an optical waveguide 3. Accordingly, the lens provided is a fresnel lens 8, which, for each light source 10a, 10b, 10c, 10d, provides individual imaging and deflection of the laser beam in such a way that all the laser beams are spatially brought to congruence at a point (or small region) on the end face 31 of the optical waveguide 3.

Figure 3:
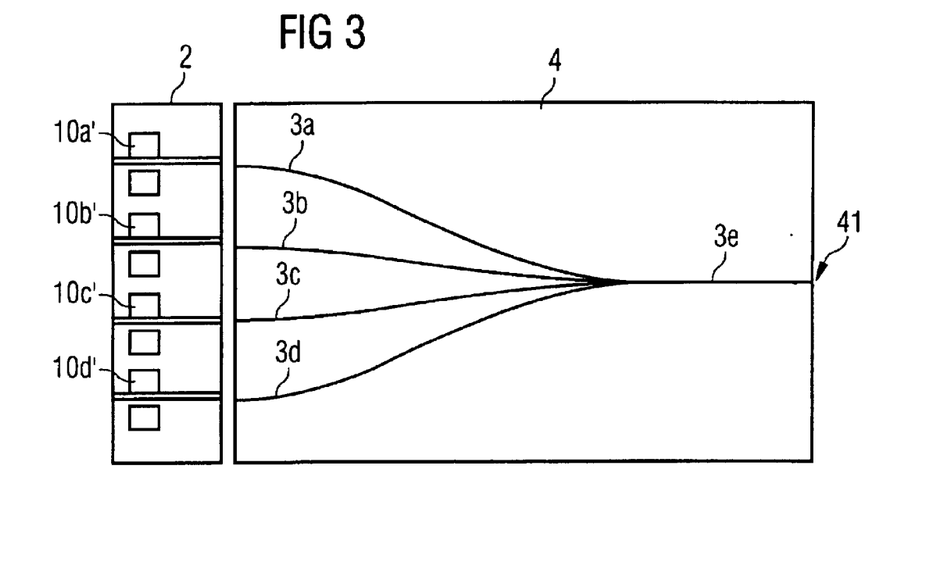
FIG. 3 is a side-elevational view of a second embodiment of an optical transmitter.

FIG. 3 illustrates an alternative configuration of laser diodes in a transmitter according to the invention, in which a plurality of edge emitting (EEL) laser diodes 10a', 10b', 10c', 10d' are disposed on a substrate 21 in an elongate array. The EEL laser diodes 10a', 10b', 10c', 10d' are once again controlled independently of one another and electrical signals are applied to them in each case via a non-illustrated driver circuit.

In the exemplary embodiment of FIG. 3, each laser diode 10a', 10b', 10c', 10d' is assigned a separate optical waveguide 3a, 3b, 3c, 3d, into which the light from the respective laser diode is coupled directly or via a coupling optical configuration. The optical waveguides 3a, 3b, 3c, 3d are constructed, for example, on an integrated optical chip, as glass waveguides on a silicon substrate 4. The individual waveguides 3a, 3b, 3c, 3d are combined on the substrate 4 to form a single waveguide 3e, whereby the signals of the individual laser diodes, 10a', 10b', 10c', 10d' that are coupled into the respective waveguides are likewise combined and are superposed.

In this case, the individual waveguides 3a, 3b, 3c, 3d have the same optical length, with the result that the temporal sequence of the light signals of the individual laser diodes 10a', 10b', 10c', 10d' are reproduced uncorrupted in the combined waveguide 3e.

A non-illustrated output waveguide which transmits the entire optical data stream can, for example, be fitted to the substrate edge 41 at the end of the waveguide 3e.

Figure 4:
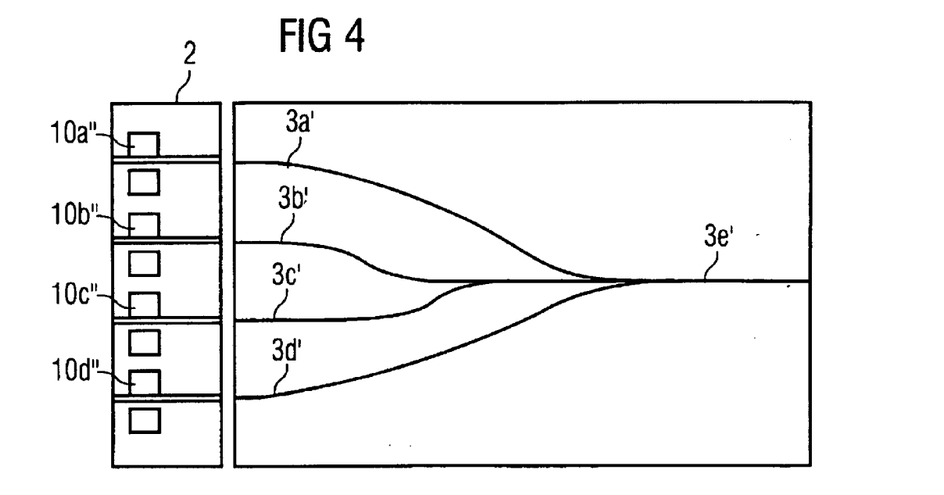
FIG. 4 is a side-elevational view of a third embodiment of an optical transmitter.

FIG. 4 shows a further exemplary embodiment of an optical transmitter according to the invention with laser diodes 10a", 10b", 10c", 10d", which differs from the exemplary embodiment of FIG. 3 in terms of length of the waveguides 3a', 3b', 3c', 3d' and also the type of electrical driving of the laser diodes. The latter point will be explained further below. In contrast to FIG. 3, the individual waveguides 3a', 3b', 3c', 3d' each have a different optical length before the waveguides are united again to form a common waveguide 3e'. In this case, the length difference DL between two waveguides 3a', 3b', 3c', 3d' corresponds exactly to the length of a light pulse emitted by the laser diodes 10a', 10b', 10c', 10d', or to the length of one bit of the data signal to be transmitted, or to a multiple of the above-noted length.

The electrical driving of the laser diodes of FIGS. 1 to 3 according to the invention is explained below using the signal examples of FIGS. 5 and 6. In FIG. 5, the signal sequence X to be transmitted, which is initially present in electrical form, is a constant HIGH level with 12 HIGH states, that is to say a sequence of "1" bits. This input signal that is to be converted into an optical output signal is fed to a control device 5. The control device 5 distributes the incoming bits of the input signal X in order and cyclically between different control channels 51, 52, 53, 54, which are fed to the individual laser diodes 10a, 10b, 10c, 10d, 10a or the driver circuits 61, 62, 63, 64 thereof. In this case, every fourth bit is respectively applied to a control channel, i.e. the first, fifth, ninth, etc. bit is applied to the control channel 51, the second, sixth, tenth, etc. bit is applied to the control channel 52, etc.

It is pointed out that the illustration of the control device 5 and of the driver circuits 61, 62, 63, 64 in FIG. 5 is only schemmatic. In particular, the driver circuits are preferably integrated together with the control device in a chip.

The electrical driving of the laser diodes 10a, 10b, 10c, 10d, 10a', 10b', 10c', 10d' is such that each laser diode outputs a short pulse only given the presence of a "HIGH" level or "1" bit a, b, c, d. In this case, what is achieved by the driving is that the pulses a, b, c, d of the individual laser diodes are always emitted temporally alternately one after the other. Two laser diodes can never transmit simultaneously. The resultant optical signals of the laser diodes are illustrated in the pulse representations A, B, C, D.

As a result of the optical superposition of the individual light sources which in each case emit signals a, b, c, d offset by one bit, the complete optical data signal X to be transmitted is once again produced, as explained with reference to FIGS. 1 to 3.

As is directly apparent from FIG. 5, before a HIGH state ("1" bit), each laser diode is in a LOW state ("0" bit) for three bit periods in each case. In the event of a new HIGH state, a defined oscillation build-up operation therefore takes place without the presence of disturbing influences of earlier HIGH states. This ensures that a pulse shape that is as uniform as possible is generated, as a result of which the data transmission frequency can be considerably increased.

In the exemplary embodiment of FIG. 6, a signal sequence X', which is an alternating "0101 . . . " sequence, is illustrated as a further example. Given the same distribution of the signal states between the control channels 51, 52, 53, 54 by the control device 5 as in the case of FIG. 5, two laser diodes emit no pulses in accordance with the pulse sequences A', C', while the other two laser diodes emit light pulses in accordance with the pulse sequences B', D'.

Any desired pulse sequences can be distributed between the individual laser diodes by the control device 5.

In the exemplary embodiments of FIG. 4, the bit states of the input signal X in the control device 5 are likewise split between individual control channels. In this case, however, the incoming data bits are firstly collected in the control device and then simultaneously transferred to the respective laser diodes or driver devices. Consequently, the individual driver devices are controlled in such a way that all the laser diodes simultaneously output a light pulse. In this case, the same number of bits as the number of laser diodes is emitted simultaneously in each case. Accordingly, the control device 5 sends control signals to the individual laser diodes or driver circuits in each case when a number of bits which is equal to the number of laser diodes is present.

In this configuration, the bit sequence of the original signal is reconstructed by way of the optical paths of different lengths of the individual optical waveguides 3a', 3b', 3c', 3d', as described with reference to FIG. 4.

In a further embodiment of the invention, as in the case of the exemplary embodiment of FIG. 4, the laser diodes are driven in such a way that the laser diodes simultaneously output a light pulse (given the presence of a HIGH level). However, the optical signals generated are not separated again and brought into their correct order through the use of different optical paths, but rather are transmitted simultaneously in an output waveguide. The resultant coding is known as "multilevel coding". Although there is a certain loss of information, N+1 values can still be coded as result of the superposition of the individual signals for N bits. By way of example, five values (0, 1, 2, 3, 4) can be coded given four light sources and bits emitted simultaneously by the latter.

The embodiment of the invention is not restricted to the exemplary embodiments explained above. For example, the number of four laser diodes is to be understood as being provided only by way of example. A different number of laser diodes, for instance 8, 16 or else 6 laser diodes, can equally be used. Furthermore, the control device 5 could also perform nonuniform distribution of the data bits of the input signal between the individual laser diodes, for instance in order, for specific reasons, to burden specific laser diodes less.

All that is essential for the invention is that there be a plurality of independently drivable light transmitters and a control device which performs a distribution between the light transmitters of the bits of a digital electrical signal sequence that is to be converted into a digital optical signal sequence. The light transmitters generate an optical signal for each of the bits obtained and the optical signals generated by the plurality of light transmitters are combined and superposed into an optical signal path.

I claim:

1. An optical transmitter for generating a digital optical signal sequence, comprising:
    a plurality of independently drivable light transmitters, said light transmitters generating respective optical signals for respective bits of a digital electrical signal sequence, said respective optical signals having a length, immediately after signal generation, not greater than a length, of the corresponding respective bits of the digital electrical signal sequence, said respective optical signals being combined and superposed into an optical signal path; and
    a control device distributing the bits between said light transmitters, said bits being distributed sequentially and cyclically such that a separate output is generated for each bit of said digital electrical signal sequence and before a HIGH state output, a respective light transmitter is in a LOW state output for at least one bit period.

2. The transmitter according to claim 1, wherein said light transmitters generate said respective optical signals in a temporally staggered manner.

3. The transmitter according to claim 2, wherein the bits of the digital electrical signal sequence are alternately applied to said light transmitters by said control device in a fixed temporal order.

4. The transmitter according to claim 1, wherein said control device distributes between said light transmitters a number of bits of the digital electrical signal sequence which corresponds to a number of said light transmitters, and said light transmitters simultaneously generate said respective optical signals.

5. The transmitter according to claim 4, wherein said respective optical signals are combined and superposed in said optical signal path in a temporally staggered manner.

6. The transmitter according to claim 5, wherein said optical signal path has a respective different length for each of said respective optical signals, said respective different length corresponding in each case to a length of one bit effecting a temporally staggered superposition of said respective optical signals.

7. The transmitter according to claim 4, wherein said respective optical signals are combined and superposed in the optical signal path in a non-temporally staggered manner.

8. The transmitter according to claim 1, wherein each of said light transmitters generates a pulse for a bit of the digital signal sequence, said bit being assigned by the control device.

9. The transmitter according to claim 1, wherein said light transmitters are disposed at a short distance from one another on a semiconductor chip.

10. The transmitter according to claim 1, further comprising a single waveguide disposed directly downstream of said light transmitters, said optical waveguide receiving said respective optical signals emitted by said light transmitters.

11. The transmitter according to claim 1, wherein said light transmitters is assigned to respective optical waveguides receiving said respective optical signals emitted, each of said respective optical waveguides being combined to form said single waveguide.

12. The transmitter according to claim 10, wherein said respective optical signals from said light transmitters are coupled into the optical waveguide via a coupling optical configuration.

13. The transmitter according to claim 1, wherein an even number of light transmitters are provided.

14. The transmitter according to claim 1, wherein four light transmitters are provided.

15. The transmitter according to claim 1, wherein said light transmitters are EEL or VCSEL laser diodes disposed as an array.

16. A method for generating a digital optical signal sequence, which comprises the steps:

generating respective optical signals for respective bits of a digital electrical signal sequence, the respective optical signals having a length, immediately after generation, not greater than a length of the respective bits of the digital electrical signal sequence;

distributing bits of an electrical signal sequence sequentially and cyclically between light transmitters generating a respective optical signal for each bit of the bits such that before a HIGH state output, a respective light transmitter is in a LOW state for at least one bit period; and combining and superposing each of the respective optical signal generated by the light transmitters in an optical signal path.

17. The method according to claim 16, wherein the step of generating the respective optical signal for each bit of the bits is performed in a temporally staggered manner.

18. The method according to claim 17, wherein the step of generating the respective optical signal for each bit of the bits is performed in that the respective light transmitters generate the respective optical signal alternately and in a fixed order.

19. The method according to claim 16, wherein the step of generating the respective optical signal for each bit of the bits is performed in that the light transmitters simultaneously generate the respective optical signal after a respective bit of the electrical signal sequence has been obtained.

20. The method according to claim 19, wherein the step of combining and superposing the respective optical signals generated by the light transmitters into an optical signal path is performed in a temporally staggered manner by use of respective signal paths of different lengths.

21. The method according to claim 20, further comprising the step of coupling the respective optical signal of each of the light transmitters are into an optical waveguide having a different length before combining and superposing the optical signals generated.

22. The method according to claim 19, wherein the step of combining and superposing the respective optical signal generated by the light transmitters into an optical signal path is performed in a non-temporally staggered manner.

23. The method according to claim 16, wherein the respective optical signal emitted by one of the light transmitters is a light pulse.

24. The transmitter according to claim 1, wherein said control device distributes said bits such that before a HIGH state output, the respective light transmitter is in a LOW state for three bit periods.

25. A method for generating a digital optical signal sequence, which comprises the steps:

generating respective optical signals for respective bits of a digital electrical signal sequence, the respective optical signals having a length not greater than a length of the respective bits of the digital electrical signal sequence;

distributing bits of an electrical signal sequence between light transmitters generating a respective optical signal for each bit of the bits such that before a HIGH state output, a respective light transmitter is in a LOW state for three bit periods; and combining and superposing each of the respective optical signal generated by the light transmitters in an optical signal path.

* * * * *